United States Patent [19]
Adams, III

[11] Patent Number: 6,057,873
[45] Date of Patent: *May 2, 2000

[54] ELECTRICAL ISOLATION OF CATV DEVICES

[75] Inventor: Lewis E. Adams, III, Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,521

[22] Filed: Sep. 18, 1996

[51] Int. Cl.$^7$ ........................................... H04N 7/16
[52] U.S. Cl. ................................. 348/6; 361/119; 455/3.1
[58] Field of Search ..................... 348/6, 7, 8, 9, 348/10, 11, 12, 13, 14; 455/3.1, 4.2, 5.1, 6.1, 6.2, 6.3; 333/12, 24 R, 25, 32, 177, 181; 361/119, 120, 117; H04N 7/16, 7/173

[56] References Cited

U.S. PATENT DOCUMENTS

| | | | |
|---|---|---|---|
| 3,980,976 | 9/1976 | Tadama et al. | 333/73 C |
| 4,229,714 | 10/1980 | Yu | 333/12 |
| 4,359,764 | 11/1982 | Block | 361/119 |
| 4,544,984 | 10/1985 | Kawanami et al. | 361/119 |
| 4,575,691 | 3/1986 | Capek et al. | 333/12 |
| 4,987,391 | 1/1991 | Kusiak, Jr. | 333/12 |
| 5,122,921 | 6/1992 | Koss | 361/111 |
| 5,132,649 | 7/1992 | Sakamoto et al. | 333/167 |
| 5,351,018 | 9/1994 | Lehmann et al. | 333/12 |
| 5,355,162 | 10/1994 | Yazolino et al. | 348/11 |
| 5,420,551 | 5/1995 | Conte et al. | 333/12 |

*Primary Examiner*—Chris Grant
*Attorney, Agent, or Firm*—Blakely, Sokoloff, Taylor & Zafman

[57] ABSTRACT

A method of isolating an appliance coupled to receive radio frequency (RF) broadcast signals from an electrical hazard includes the step of coupling a first and second conductor for providing the RF broadcast signals to an isolation device. The isolation device is coupled to the appliance so that the first and second conductors are electrically isolated from at least one of the chassis and the ground of the appliance. An apparatus for isolating appliances such as community antenna television (CATV) devices coupled to receive RF broadcast signals from an electrical hazard includes an isolation device, such as an isolation transformer. The isolation device is coupled to two conductors provided for receiving the RF broadcast signals. The isolation device is also coupled to the appliance. The isolation device electrically isolates each of the two conductors from at least one of the ground and the chassis of the appliance. The methods and apparatus are particularly applicable for isolating CATV devices (e.g., computer systems, television, radios, videocassette recorders, etc.) coupled to receive RF broadcasts from an electrical hazard impressed upon the CATV coaxial cable.

15 Claims, 3 Drawing Sheets

ELECTRICAL ISOLATION OF CATV DEVICES

FIELD OF THE INVENTION

This invention relates to the field of consumer electronic product safety. In particular, this invention is drawn to isolating devices coupled to receive radio frequency (RF) broadcasts from electrical hazards.

BACKGROUND OF THE INVENTION

A number of consumer electronic products use two conductors or two wires to communicate power from a power source to the appliance. Typically an electrical cord having two wires is connected to the appliance at one end and terminates in a two prong plug (one prong for each wire) at the other end. The two prong plug is then plugged into a power source, for example a power outlet or wall outlet. Consumer appliances such as kitchen appliances, televisions, stereos, and other consumer electronics are often "two-wire" appliances.

Other consumer electronic appliances are "three-wire" appliances. These three-wire appliances are connected to a power source, such as that provided by a wall outlet, using three-wires. Two of the three wires are connected between the power source and the appliance as they are for the two-wire appliance. The third wire is provided as a safety feature in order to dissipate an electrical hazard to ground. The third wire is variously referred to as the ground wire or the ground conductor. A computer system, such as that found in a home or office environment, is one example of a three-wire appliance. The chassis and metal enclosures for many three-wire appliances are coupled to the ground conductor in order to protect the consumer in the event that an electrical hazard is communicated to the chassis or the enclosure of the three-wire appliance. Ideally, any electrical hazard impressed upon the chassis or enclosure of a three-wire appliance will be diverted to ground through the ground conductor.

One manner in which an electrical hazard can be communicated to a two-wire or three-wire appliance is through a community antenna television (CATV) coaxial cable. CATV coaxial cables are commonly used to distribute radio frequency (RF) broadcast signals. Generally, any appliance that can be coupled to a CATV coaxial cable is a CATV device. The shield of the coaxial cable is typically connected to the chassis of the CATV device. Thus if the coaxial cable is exposed to an electrical hazard, the coaxial cable shield can communicate the hazard to the chassis of the CATV device. Furthermore, the possibility of exposure to the electrical hazard is increased if the chassis is electrically connected to a conductive enclosure of the CATV device.

A consumer can be exposed to a significant electrical hazard if the enclosure or chassis becomes energized due to an electrical hazard present on the shield of the CATV coaxial cable. For example, the CATV coaxial cable might come into contact with a power transmission line. Alternatively the CATV coaxial cable might be struck by lightning. Moreover, the hazard might be communicated to all CATV devices coupled to the CATV coaxial cable as well as any appliance coupled to any one of the CATV devices.

Electrical codes such as the *National Electrical Code* provide for the grounding of CATV coaxial cables near buildings in order to help minimize exposure to such hazards. (see, e.g., *National Electrical Code*, Art. 820 NFPA 70-1996). Unfortunately the codes do not ensure that the CATV coaxial cable has been grounded near the building or that the grounding is sufficient, especially if the building is a residential building (e.g., a single family dwelling).

Furthermore, although the ground conductor of a three-wire appliance is intended to dissipate electrical hazards, the ground conductor may not be properly or sufficiently grounded. For example, the three-wire appliance may not be plugged in at all (i.e., no ground connection). Alternatively, the three-wire plug may have been plugged into a two-wire socket (i.e., no ground connection) using an adapter plug. In another example, the ground conductor may be inadequately coupled to a ground so that the ground connection fails or is otherwise unable to fully dissipate the hazard.

Thus a method or apparatus for isolating community antenna television devices from an electrical hazard communicated on a community antenna television coaxial cable is needed.

SUMMARY OF THE INVENTION

In view of limitations of known systems and methods, a method and apparatus for isolating an appliance coupled to receive radio frequency (RF) broadcast signals from an electrical hazard is provided. A first and second conductor for providing the RF broadcast signals are coupled to an isolation device. The isolation device is coupled to the appliance so that the first and second conductors are electrically isolated from at least one of the chassis and the ground of the appliance. The method and apparatus are particular suitable for community antenna television (CATV) devices such as computer systems, televisions, radios, and videocassette recorders.

A method and apparatus of isolating a community antenna television (CATV) device from an electrical hazard communicated by a CATV coaxial cable is also provided. A CATV coaxial cable is coupled to an isolation device such as an isolation transformer. The isolation device is coupled to the CATV device, wherein a shield of the coaxial cable is electrically isolated from a chassis or ground of the CATV device.

Other features or advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A community antenna television (CATV) coaxial cable is often used to distribute CATV communications such as radio frequency (RF) broadcast signals. A coaxial cable is a two conductor transmission line. The two conductors include an inner conductor and a shield. The inner conductor is isolated from the shield by insulation. The inner conductor is surrounded by the shield throughout the length of the coaxial cable. The inner conductor is also referred to as the center conductor.

Community antenna television coaxial cable is rated for different types of installations according to fire resistance. These ratings include CATVP, CATVR, CATV, and CATVX. (see, e.g., *National Electrical Code*, Art. 820 NFPA 70-1996). The use of the term "CATV" throughout this description, however, is intended to generically refer to all types of community antenna television coaxial cables and is not intended to be limited to CATV-rated coaxial cables, unless the term "CATV-rated" is explicitly used.

Coaxial cable is also rated according to the information bandwidth that the coaxial cable can communicate. United States industry standard designations for coaxial cables commonly used for the distribution of CATV communications includes RG-6, RG-45, and RG-59 coaxial cables.

The shield of the CATV coaxial cable is usually coupled to a signal ground to help eliminate electrical interference of the signal transmitted on the center conductor. This is typically accomplished by electrically coupling the shield of the CATV cable to some part of a CATV device such as the chassis of the CATV device. If the shield of the CATV cable is exposed to an electrical hazard such as a lightning strike or a power transmission line, the shield can electrically couple the hazard to the chassis of the CATV device. Thus the consumer can be exposed to serious electrical hazards by attaching an appliance to a CATV coaxial cable.

Figure 1:
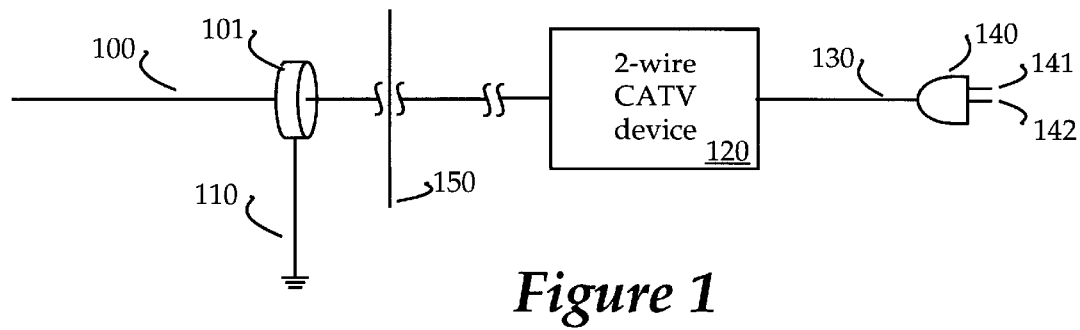
FIG. 1 illustrates a CATV coaxial cable coupled to a two-wire CATV device.

FIG. 1 illustrates a community antenna television (CATV) coaxial cable 100 coupled to a two-wire CATV device 120. (A two-wire appliance that is also a CATV device is referred to as a "two-wire CATV device.") The two-wire CATV device uses a two-wire power cord 130 terminating in a two-prong plug 140. Typically the two-prong plug 140 is plugged into a power outlet (e.g., a wall outlet) so that conductors 141 and 142 can provide power through the power cord 130 to the two-wire appliance.

One model electrical code which establishes standards for CATV systems in the interest of safety is the *National Electrical Code* (NFPA 70-1996). The National Electrical Code is sponsored by the National Fire Protection Association and represents a united effort by various insurance, electrical, architectural, and other allied interests. Although the *National Electrical Code* is only an advisory code, it is often referred to as a standard for use in law and regulatory purposes regarding electrical safety in the interest of life and property protection. (*National Electrical Code*, NFPA 70-1996 cover page, pp. 70-1 thru 70-2).

The *National Electrical Code* provides guidelines for grounding the shield of a CATV coaxial cable at building premises in order to protect against exposure to electrical hazards communicated by the shield of the CATV coaxial cable (see, e.g., *National Electrical Code*, NFPA 70-1996, Art. 820–33). In accordance with electrical codes such as the *National Electrical Code*, a shield 101 of the CATV coaxial cable 100 should be grounded 110 near the entry of the coaxial cable into a building. The building is indicated by barrier 150. As illustrated, shield 101 is exaggerated for purposes of showing its connection to ground 110. Ideally any electrical hazard impressed upon the shield of the CATV coaxial cable 100 will be diverted to ground 110.

Figure 2:
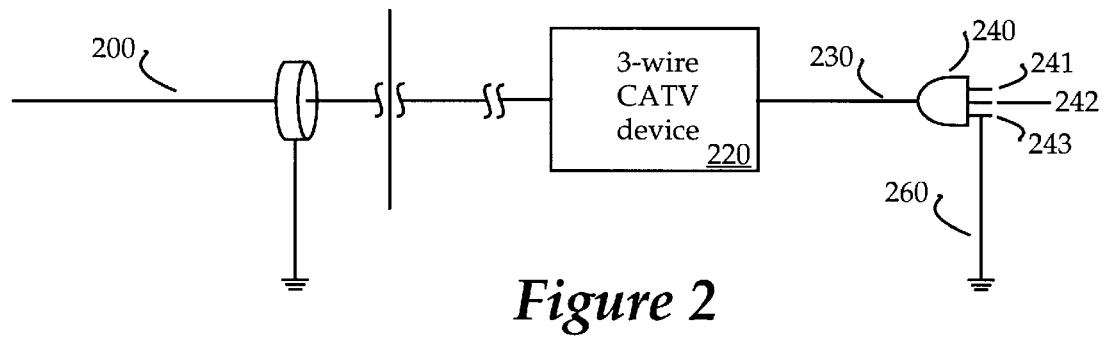
FIG. 2 illustrates a CATV coaxial cable coupled to a three wire CATV device.

FIG. 2 illustrates a CATV coaxial cable 200 coupled to a three-wire CATV device 220. (A three-wire appliance that is also a CATV device is referred to as a "three-wire CATV device.") The three-wire CATV device uses a three-wire power cord 230 terminating in a three-prong plug 240. Typically the three-prong plug 240 is plugged into a power outlet (e.g., a wall outlet) so that conductors 241 and 242 can provide power through the power cord 230 to the three-wire appliance. Power cord 230 includes a ground conductor connected to the ground prong 243 of plug 240. The ground conductor enables grounding the three-wire CATV device 220 through a ground connection 260 when the power cord 230 is plugged into a power source such as a wall socket.

Figure 3:
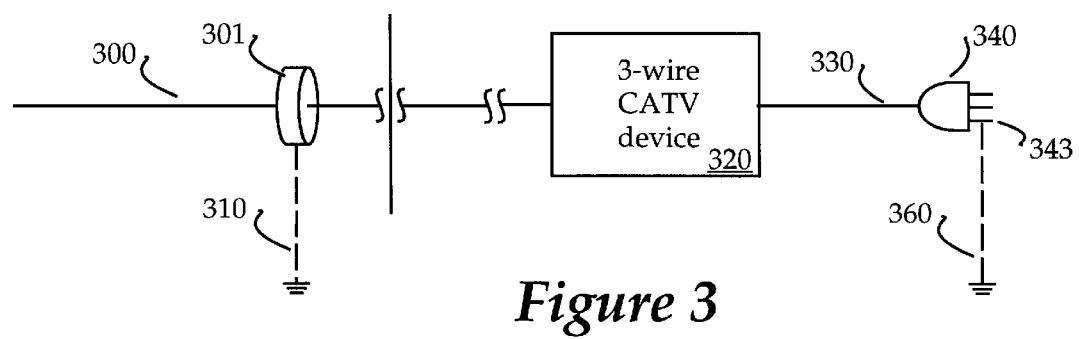
FIG. 3 illustrates CATV coaxial cable coupled to a three wire CATV device without proper grounding.

FIG. 3 illustrates a CATV coaxial cable 300 coupled to a three-wire CATV device 330 without proper or adequate grounding. With respect to shield 301, the lack of proper or adequate grounding is illustrated by dotted line 310. This might occur, for example, if shield 301 of coaxial cable is not grounded at all. Alternatively, the ground connection may not be adequate to carry the current of an electrical hazard such as a lightning strike. Thus shield 301 may be grounded through a grounding connection 310 that will fail or is otherwise unable to dissipate an electrical hazard to ground.

Similarly, the chassis of CATV device 320 might be improperly or inadequately grounded as illustrated by dotted line 360. The chassis is typically connected to ground through the ground conductor of power cord 330. The ground conductor is connected to ground prong 343 of plug 340 for connecting the chassis to ground when the power cord is plugged into a power source. Although the ground conductor of a three-wire appliance is intended to dissipate electrical hazards, the chassis might not be connected to a ground at all. This might occur, for example, if CATV device 320 is unplugged (i.e., the power cord does not connect the chassis to ground). Alternatively, the three-wire plug might be plugged into a wall outlet using a three-prong to two-prong adapter which effectively isolates the ground conductor from any connection to ground. In another example, the ground connection may be inadequate such that the ground connection will fail or is otherwise unable to dissipate an electrical hazard to ground.

CATV devices include consumer electronics such as televisions and videocassette recorders. Some cable companies also provide radio signals on the coaxial cable. Thus, for example, the coaxial cable may provide frequency modulated (FM) radio station transmissions suitable for use by a home radio or stereo system. Thus radios and stereos coupled to CATV coaxial cables are also CATV devices. Televisions, radios, videocassette recorders, and stereo systems are generally two-wire appliances.

Computer systems are another class of consumer electronics which might be coupled to a CATV coaxial cable. Home or office computer systems based upon Intel Corporation (Santa Clara, Calif.) microprocessors are examples of computer systems that can be CATV devices. Examples of such microprocessors include the Intel 80286, 80386, 80486 microprocessors, the Pentium® processor, and the Pentium® Pro processor. Tuner and receiver circuitry that has been integrated onto cards is available for computer systems. These cards can be installed in the computer system in order to provide the capability to receive CATV communications. In one embodiment, the video component of the CATV signal is displayed on a display of the computer system. The audio component of the CATV signal might be played through a speaker system coupled to the computer system.

Computer systems such as those found in a residential and office environments tend to be three-wire appliances. The chassis and metal enclosures for many three-wire appliances are coupled to the ground conductor. Computer systems often include a chassis housed in a metal enclosure. Thus the chassis and the metal enclosure of home computer systems are typically connected to the ground conductor. When a coaxial cable is connected to the computer system, the shield of the cable is grounded to the chassis. Because the enclosure is also coupled to the chassis either directly or through a common ground, any electrical hazard present on the shield of the coaxial cable is communicated to the computer system chassis and enclosure.

A consumer can be exposed to a significant electrical hazard if the enclosure or chassis becomes energized due to an electrical hazard present on the shield of the CATV coaxial cable. For example, the CATV coaxial cable could come into contact with a power transmission line. Another potential hazard is that the CATV coaxial cable might be struck by lightning.

Figure 4:
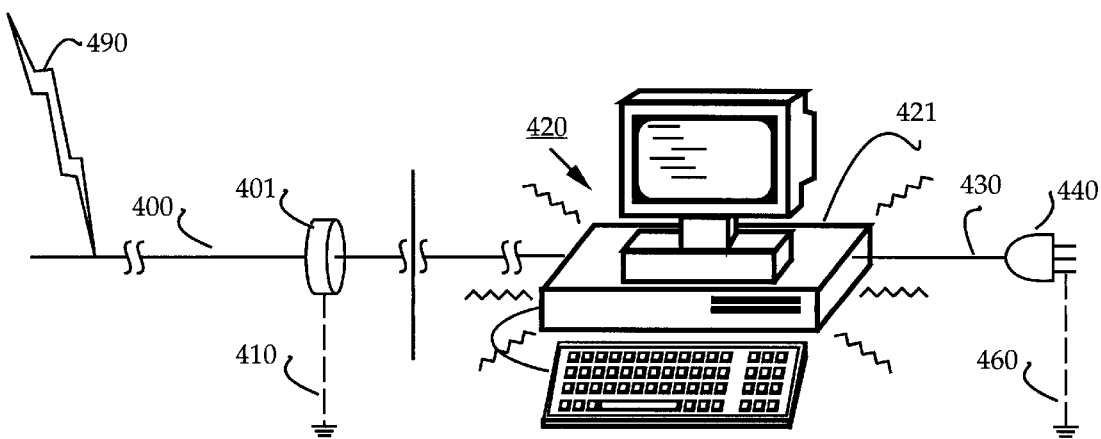
FIG. 4 illustrates exposure of a CATV appliance to an electrical hazard through the shielding of the CATV coaxial cable.

FIG. 4 illustrates how an electrical hazard may be communicated to a three-wire CATV device coupled to a CATV coaxial cable. The shield 401 of the CATV coaxial cable may be exposed to an electrical hazard, for example, by contact with a power transmission line, or perhaps a lightning strike 490. The computer system 420 is illustrated as various components. At least one component, however, is coupled to the CATV coaxial cable for receiving CATV broadcast signals.

In FIG. 4, the shield 401 is connected to a chassis of computer system 420 contained in base component 421. In this embodiment, a base component 421 of the computer system is connected to the CATV coaxial cable 400. In one embodiment, the base component 421 is housed in a metal (i.e., conductive) enclosure. In other embodiments, the base component is housed in a non-conductive enclosure.

The computer system 420 receives power from a three-wire power cord 430. The three-wire power cord terminates in a three-prong plug 440.

Although proper and sufficient grounding might be able to dissipate an electrical hazard communicated to the computer system 420, such grounding may not, in fact, exist.

For example, shield 401 may not be properly or adequately connected to ground as illustrated by dotted line ground connection 410. This could occur, for example, if shield 401 was not grounded at all. Alternatively, the ground may not be adequate to carry the current of a lightning strike 490 so that the ground is destroyed (fails to carry any current) or is otherwise unable to fully dissipate the hazard.

Similarly, the computer system may not be properly or adequately connected to ground as illustrated by dotted line ground connection 460. One example where the computer system is not grounded through power cord 430 is if power cord 430 is unplugged such that there is no electrical path to ground. This might occur, for example, if the computer system was not plugged in to receive power. Alternatively, the three-wire plug may have been plugged into a two-wire socket (i.e., no ground connection) using an adapter plug. In yet another example, the ground conductor may be improperly coupled to a ground such that the ground connection fails before the hazard is fully dissipated.

Thus a chassis of the computer system can be energized by an electrical hazard communicated to the chassis by the CATV coaxial cable. If the chassis resides within a metal enclosure, the metal enclosure is also energized by the electrical hazard as illustrated in FIG. 4.

Although FIG. 4 illustrates a three-wire appliance, the exposure to the electrical hazard can also be significant for two-wire appliances. For example, any exposed conductive part connected to the chassis becomes a safety risk. This might include control buttons, power switches, etc. Furthermore, some two-wire appliances may have a metal enclosure coupled to the shield.

In order to protect the consumer from potential safety hazards, the shield of the coaxial cable should be isolated from the chassis and the enclosure of CATV devices in a manner that permits signal communication between the CATV device and the CATV coaxial cable, but which prevents power transmission to the CATV device through the CATV coaxial cable.

In one embodiment this is accomplished by coupling the CATV coaxial cable to an isolation device. The CATV device is also coupled to the isolation device. The shield of the coaxial cable is electrically isolated from a chassis or a ground of the CATV device such that information can be communicated between the CATV device and the coaxial cable, but the electrical hazard cannot be communicated from the coaxial cable to the CATV device.

Figure 5:
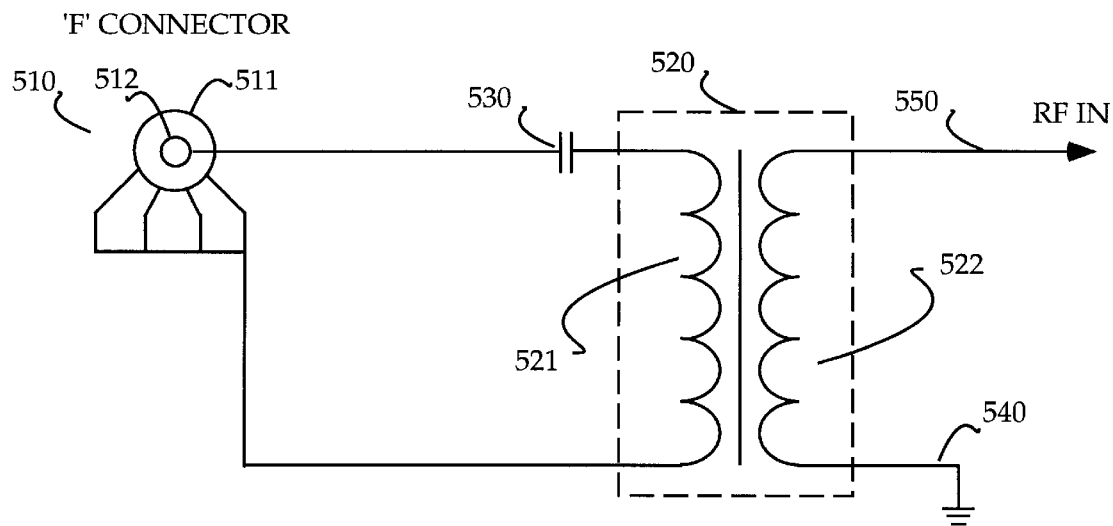
FIG. 5 illustrates an isolation transformer for isolating a CATV device from electrical hazards communicated by a CATV coaxial cable.

FIG. 5 illustrates one apparatus for isolating a community antenna television appliance from an electrical hazard presented by the coaxial cable. The coaxial cable is typically coupled to the CATV device using a connector such as 'F' connector 510. Connector 510 is coupled to an isolation device, such as isolation transformer 520. Connector 510 provides a shield connector 511 and a center conductor connector 512.

Isolation transformer includes a primary winding 521 and a secondary winding 522. The primary and secondary windings are physically separated such that there is no direct communication of electrical power between the primary and secondary windings. The primary and secondary windings are inductively coupled so that signals may be communicated from the primary to the secondary winding. The inductive coupling prevents direct communication of a potential on the primary winding 521 to the secondary winding 522.

In the illustrated embodiment, capacitor 530 is provided to substantially eliminate the transmission of low frequency (e.g., 50–60 Hz signals) or zero frequency (i.e., d.c.) signals in order to protect the primary winding 521 of transformer 520. Capacitor 530 is not required and can be eliminated in alternative embodiments.

One side of primary winding 521 is coupled to shield connector 511. Another side of primary winding 521 is coupled to center conductor connector 512. Thus when a CATV coaxial cable is coupled to connector 510, the CATV communication signals are coupled to primary winding 521. One side 540 of secondary winding 522 is coupled to the chassis of the CATV device. The secondary winding 522 receives the CATV communication signals through inductive coupling with the primary winding 521. The received CATV communication signals are provided by the other side 550 of secondary winding 522.

The isolation device should have a higher breakdown rating than both the CATV coaxial cable and the connector 510. The coaxial cable will breakdown when the potential difference between the center conductor and the shield reaches a predetermined coaxial cable breakdown voltage. The "F" connector will breakdown when the potential difference between the center conductor connector 512 and the shield connector 511 reaches a predetermined connector breakdown voltage. In order to ensure that the isolation device does not fail before the coaxial cable or the connector fails, the isolation device breakdown rating should be higher than both the connector breakdown voltage and the coaxial cable breakdown voltage.

Figure 6:
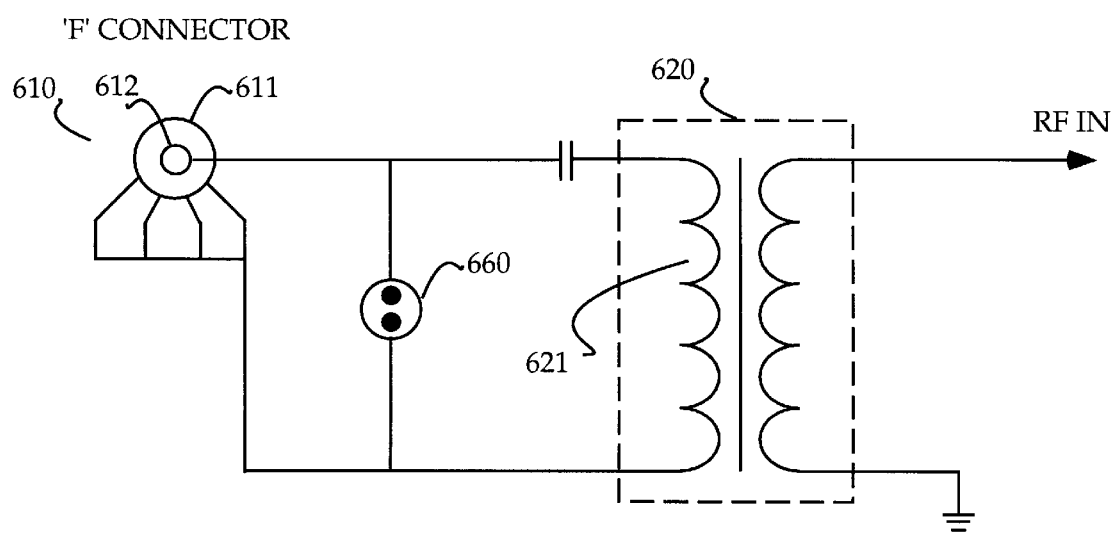
FIG. 6 illustrates an isolation transformer with an electrical surge protector.

FIG. 6 illustrates another embodiment of the isolation device. Shunt device 660 ensures that the coaxial cable is shorted out at a predetermined shunt threshold voltage. When the potential voltage across shunt device 660 reaches the shunt threshold voltage, the shunt device will conduct and thus short the center conductor connector 612 to the shield connector 611. When a coaxial cable is coupled to connector 610, the shunt device helps to ensures that the primary winding 621 of the isolation transformer 620 will not be exposed to a potential significantly in excess of the shunt threshold voltage. Shunt device 660 may not be necessary if the breakdown rating of isolation transformer 620 is significantly in excess of the coaxial cable breakdown voltage. Alternatively, shunt device 660 may be used to permit use of an isolation transformer with a lower breakdown rating. In various embodiments, the shunt device or surge protector comprises a gas discharge device, a diode, or a metal oxide varistor. Other shunt devices or surge protectors are well known in the art.

In one embodiment, the isolation device is incorporated within the CATV device. Integrating the isolation device into the CATV device at the time of manufacture helps to minimize dependency upon the consumer or third parties for protection of the CATV device from electrical hazards.

In another embodiment, the isolation device is external to the CATV device. This embodiment can be used to protect existing CATV devices. Referring to FIG. 5, secondary winding 522 can be coupled to a second coaxial cable to provide the RF IN signal to the CATV device. RF IN 550 is coupled to the center conductor of the second coaxial cable. Ground 540 is realized by coupling secondary winding 522 to the chassis or enclosure of the CATV appliance using the shield of the second coaxial cable.

Although the examples provided above were drawn to isolation of devices coupled to community antenna television coaxial cables, the method and apparatus are generally applicable to any consumer electronic equipment coupled to receive radio frequency (RF) broadcast signals including televisions, radios, stereos, videocassette recorders, and computer systems. Thus for example, the signals may be provided by a standalone antenna rather than by a CATV coaxial cable.

Standalone antennas are typically coupled to consumer appliances with "twin-lead" antenna wire. The consumer appliance is coupled to each of the two leads or conductors in the "twin-lead" wire in order to receive RF broadcast signals detected by the standalone antenna. Referring to FIGS. 5 and 6, the two conductors of the twin-lead antenna wire should be coupled to the isolation device in the same manner as the two conductors of the coaxial cable.

Consider, for example, the isolation transformer 520 of FIG. 5 as the isolation device. A first conductor of the twin-lead antenna wire should be coupled to one side of primary winding 521. A second conductor of the twin-lead antenna wire should be coupled to the other side of primary winding 521. The physical separation of the primary and secondary windings helps to protect the consumer from a direct power transfer from the standalone antenna.

Thus appliances coupled to receive RF broadcast signals can be isolated from electrical hazards impressed upon the two conductors used for receiving RF broadcast signals. The first and second conductors are coupled to an isolation device. The isolation device is coupled to the appliance so that the two conductors are electrically isolated from a chassis or a ground of the consumer appliance. This might be accomplished, for example, by coupling the first and second conductors to the primary winding of an isolation transformer. The RF broadcast signal is provided by the secondary winding of the isolation transformer to the appliance.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of isolating an appliance coupled to receive radio frequency (RF) broadcast signals from an electrical hazard, comprising the steps of:
    a) coupling a shield and an inner conductor of a community antenna television (CATV) coaxial cable for providing the RF broadcast signals to an isolation device; and
    b) coupling the isolation device to the appliance, wherein the shield and the inner conductor are electrically isolated from at least one of a chassis and a ground of the appliance.

2. The method of claim 1 wherein the appliance comprises at least one of a computer system, a television, a radio, and a videocassette recorder.

3. The method of claim 1 wherein the chassis of the appliance is electrically connected to an enclosure of the appliance.

4. The method of claim 1 wherein the ground of the appliance is electrically connected to an enclosure of the appliance.

5. The method of claim 1 wherein the isolation device comprises an isolation transformer.

6. The method of claim 1 wherein the appliance is a three-wire appliance.

7. An apparatus for isolating appliances coupled to receive radio frequency (RF) broadcast signals from an electrical hazard, comprising:
    an isolation transformer, wherein the isolation transformer is coupled to an inner conductor and a shield of a community antenna television (CATV) coaxial cable for receiving the RF broadcast signals, wherein the isolation transformer is coupled to the appliance, wherein the isolation transformer electrically isolates each of the shield and the inner conductor from at least one of a ground and a chassis of the appliance.

8. The apparatus of claim 7 wherein the appliance comprises at least one of a computer system, a television, a radio, and a videocassette recorder.

9. The apparatus of claim 7 wherein the ground of the appliance is electrically connected to an enclosure of the appliance.

10. The apparatus of claim 7 wherein the chassis of the appliance is electrically connected to an enclosure of the appliance.

11. The apparatus of claim 7 further comprising:
    a shunt device coupled to the isolation transformer such that the shunt device shorts the shield and the inner conductor if a potential voltage across the shunt device exceeds a pre-determined threshold.

12. The apparatus of claim 7 wherein the isolation transformer electrically isolates each of the shield and the inner conductor from both the ground and the chassis of the appliance.

13. A community antenna television (CATV) device comprising:
  an isolation device for isolating the CATV device from an electrical hazard, wherein the isolation device electrically isolates a shield of a CATV coaxial cable from at least one of a ground and a chassis of the CATV device when the isolation device is coupled to the CATV coaxial cable for receiving radio frequency broadcast signals.

14. The CATV device of claim 13 wherein the CATV device comprises at least one of a computer system, a television, a radio, and a videocassette recorder.

15. The CATV device of claim 13 wherein the isolation device is an isolation transformer.

* * * * *